Figure 1:
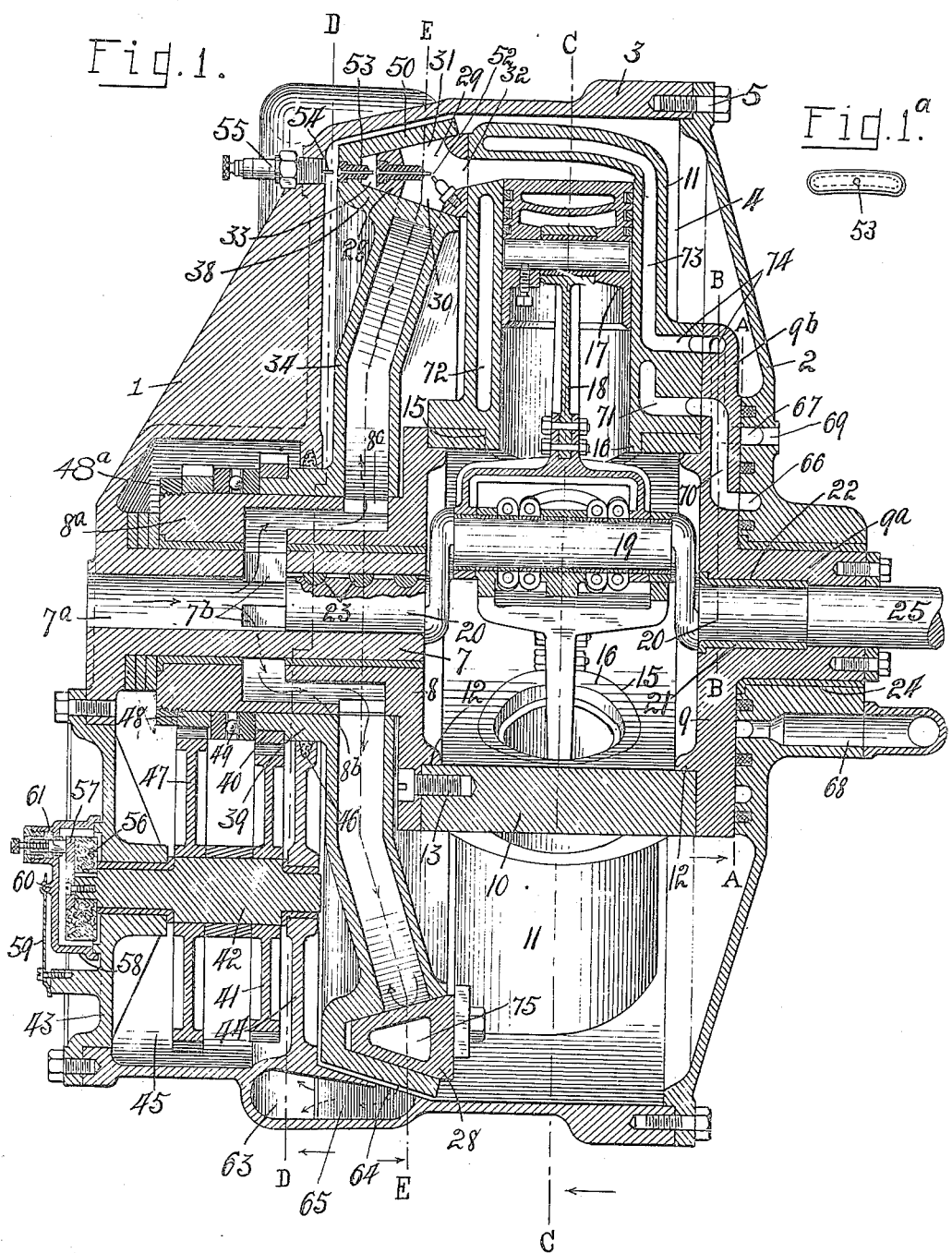

H. A. MYERS.
ROTARY ENGINE.
APPLICATION FILED APR. 4, 1914.

1,229,643.

Patented June 12, 1917.
11 SHEETS—SHEET 5.

WITNESSES:
D. C. Walter
R. S. Allen

INVENTOR.
Hubert A. Myers
By Owen, Owen & Crampton,
His attys.

INVENTOR.
Hubert A. Myers,
By Owen, Owen & Crampton
His attys.

WITNESSES:

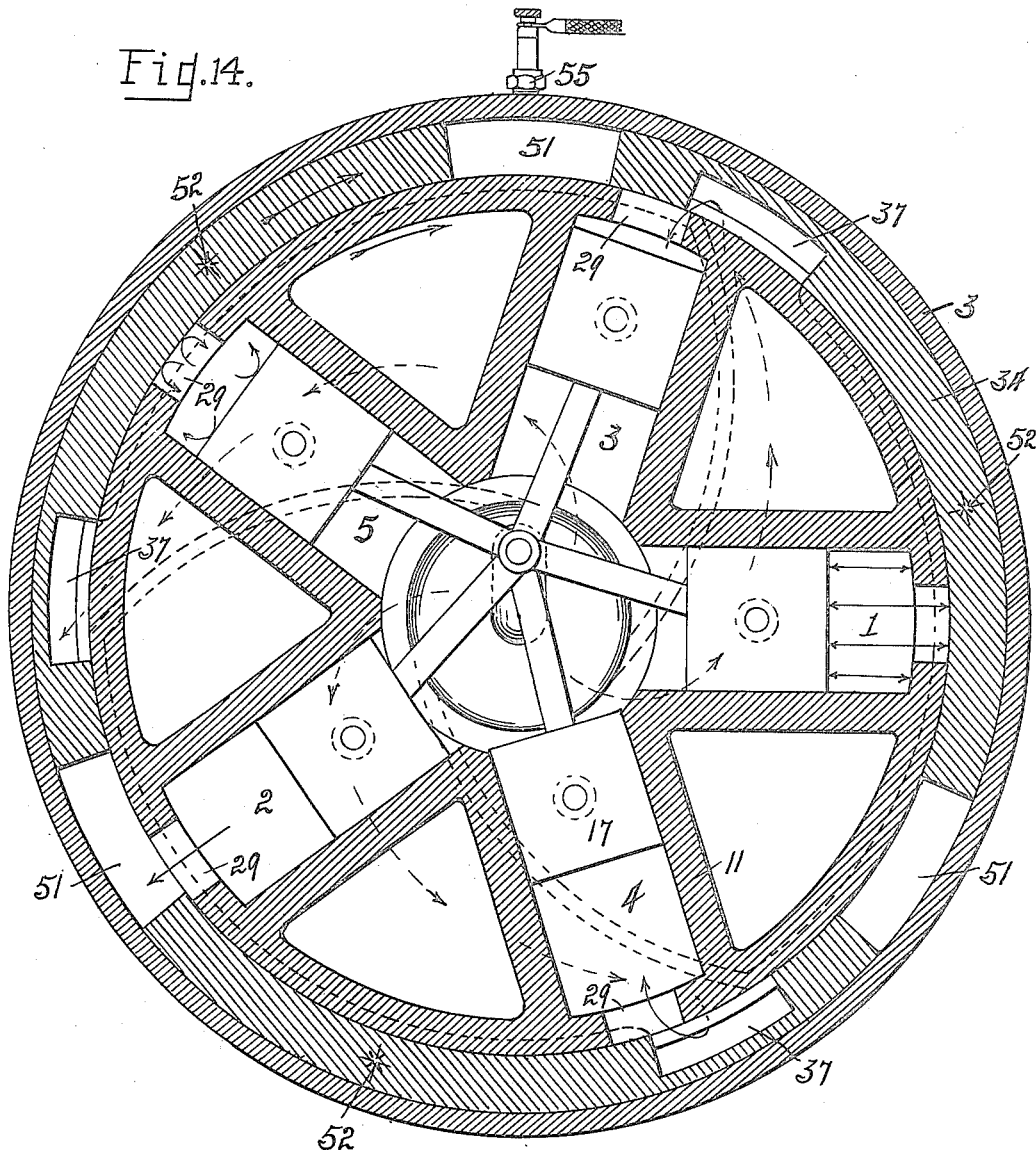

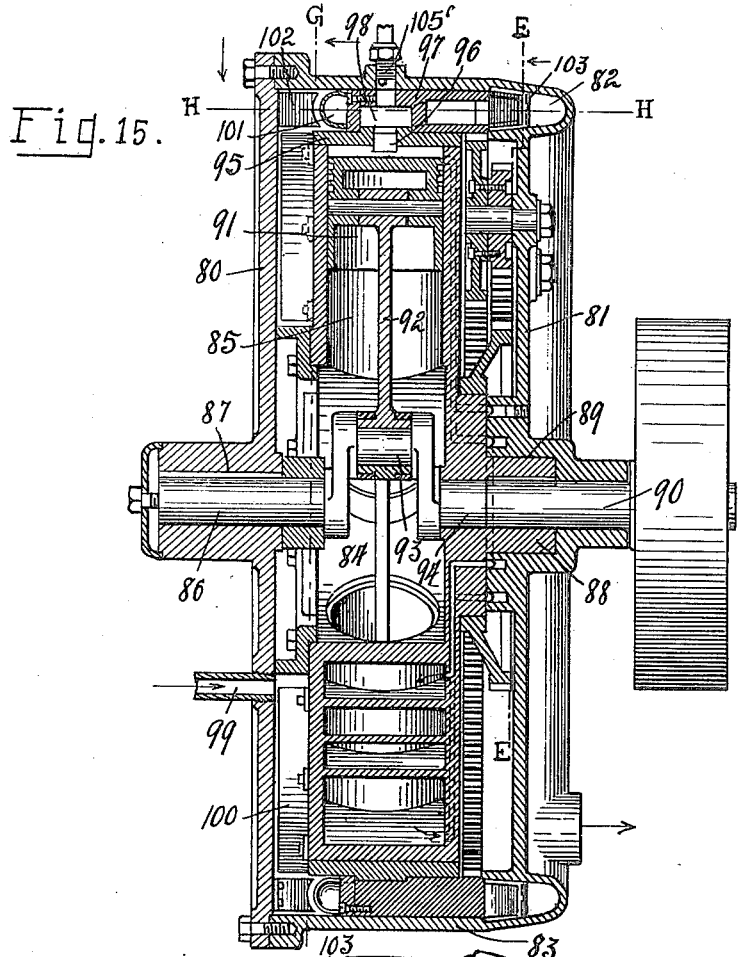
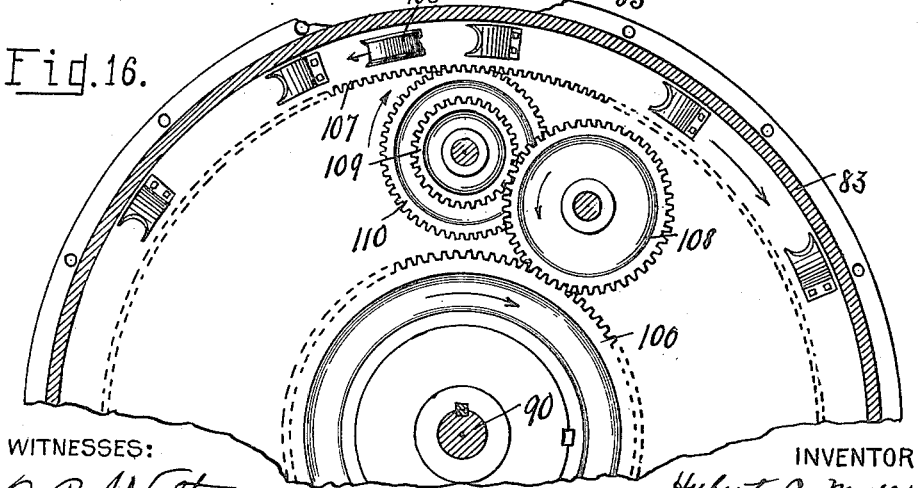

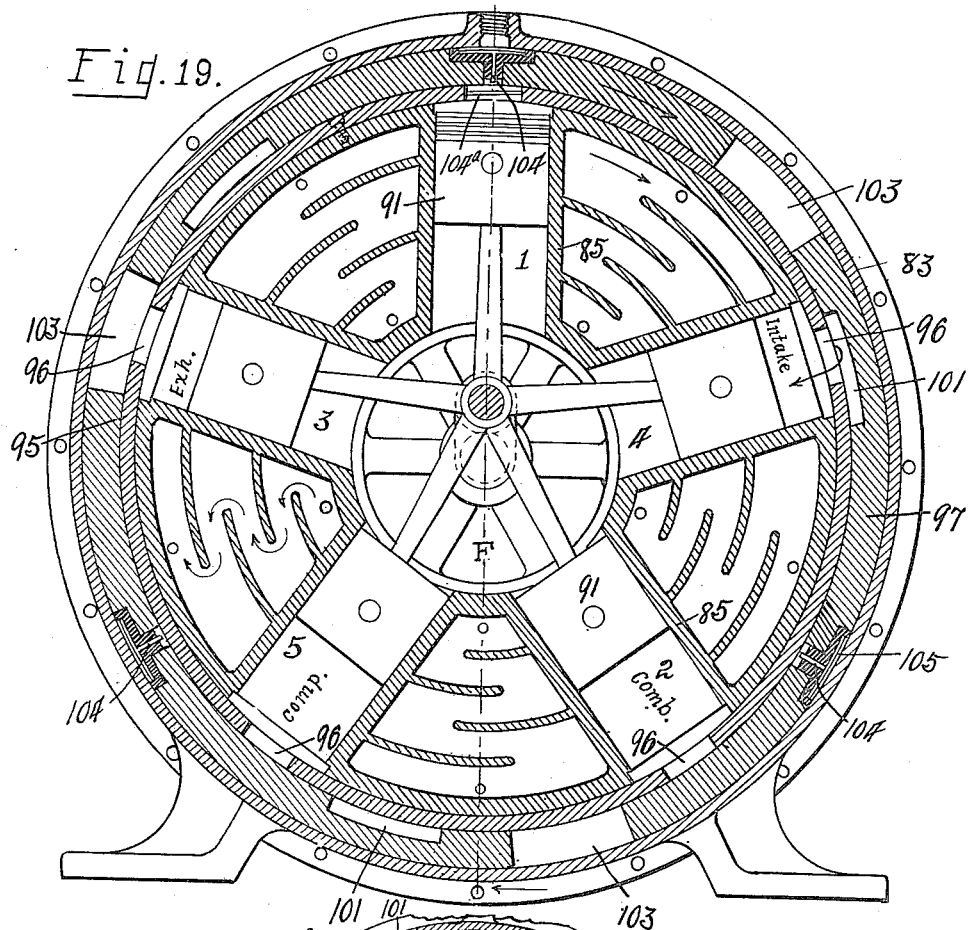

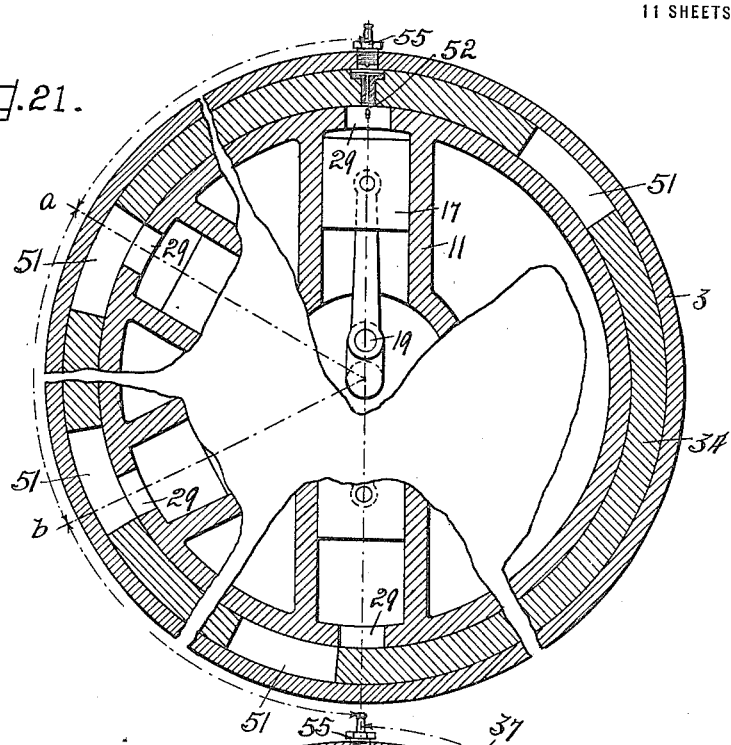
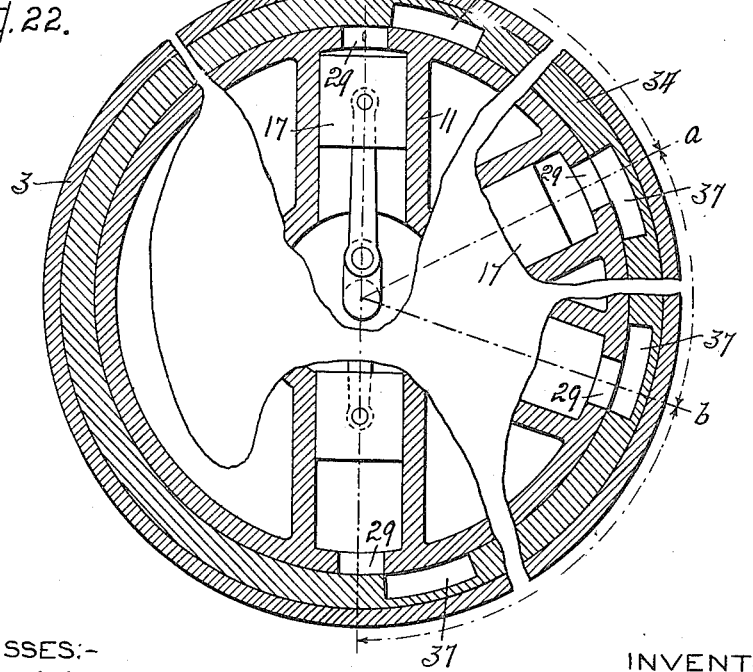

UNITED STATES PATENT OFFICE.

HUBERT A. MYERS, OF TOLEDO, OHIO, ASSIGNOR OF ONE-HALF TO ARTHUR S. HICKOK, OF TOLEDO, OHIO.

ROTARY ENGINE.

1,229,643.      Specification of Letters Patent.      Patented June 12, 1917.

Application filed April 4, 1914. Serial No. 829,492.

*To all whom it may concern:*

Be it known that I, HUBERT A. MYERS, a citizen of the United States, and a resident of Toledo, in the county of Lucas and State of Ohio, have invented a certain new and useful Rotary Engine; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates particularly to internal combustion engines of the rotary multiple cylinder type.

While the invention is particularly intended for use in connection with a four-cycle engine of this type, it is to be understood that it is not restricted to use in such connection, nor to the use of any particular type of actuating fluid or vapor, although the engine illustrated is of the internal combustion type, taking gas or other suitable explosive mixture as a fuel; and also that the different novel features of the engine are not limited to use in the combination herein shown or in connection with any particular type of engine, but are intended for use in any connection for which they may be adapted or appropriate.

The primary object of my invention is the provision of a multiple cylinder internal combustion engine which is efficient in its operation, light and durable in its construction, simple and inexpensive to manufacture, and economical in the use of fuel, thus enhancing the practicability and commercial value of motors of this character.

A further object of the invention is the provision, in combination with a rotary engine of the character described, having an annular series of ports, of means which is rotatable by and relative to the rotor portion of the engine for controlling the properly timed admission of a liquid fuel or actuating fluid to and the exit of exhaust gases or vapors from the respective cylinders.

A further object of the invention is the provision, in an engine of the character described, of means for controlling the exhaust of burnt gases therefrom, whereby the exhaust from each cylinder takes place during approximately the full exhaust stroke of the piston thereof, thus entirely exhausting the burnt gases from the cylinder before taking in a further charge and consequently securing the maximum efficiency of the charge due to its not being diluted by exhaust gases remaining in the cylinder.

A further object of my invention is the provision, in an engine of the character described, of rotatable means which serves both as a valve for controlling the inlet and exhaust of gases to and from the cylinders and to act as a pump for forcing the charges under pressure into the cylinders upon an opening of the inlet ports thereof. Further objects and advantages of the invention will be apparent from the following detailed description.

The invention is fully described in the following specification, and while, in its broader aspect, it is capable of embodiment in numerous forms, a preferred and one modified form only thereof are illustrated in the drawings, in which,—

Figure 2:
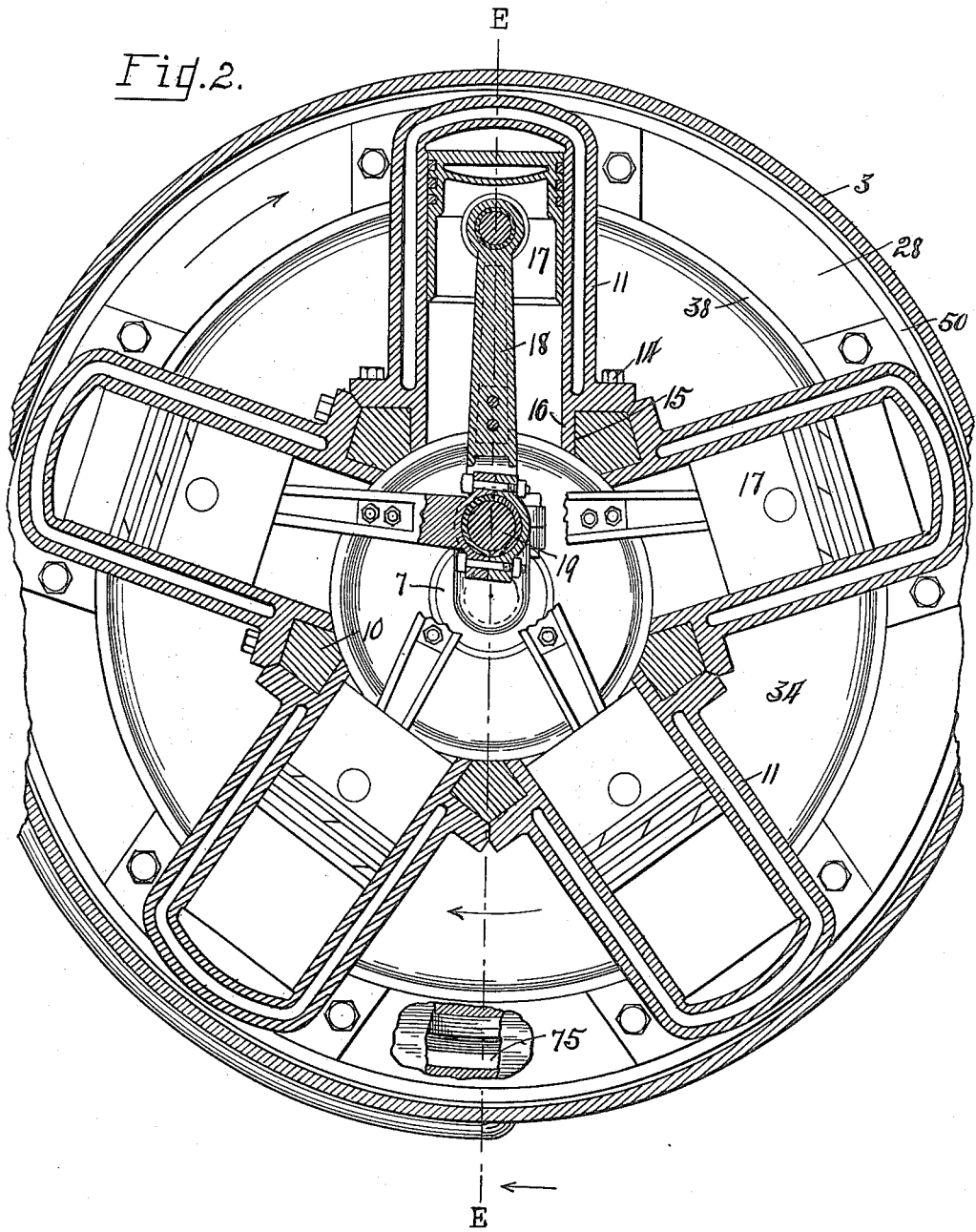
Figure 3:
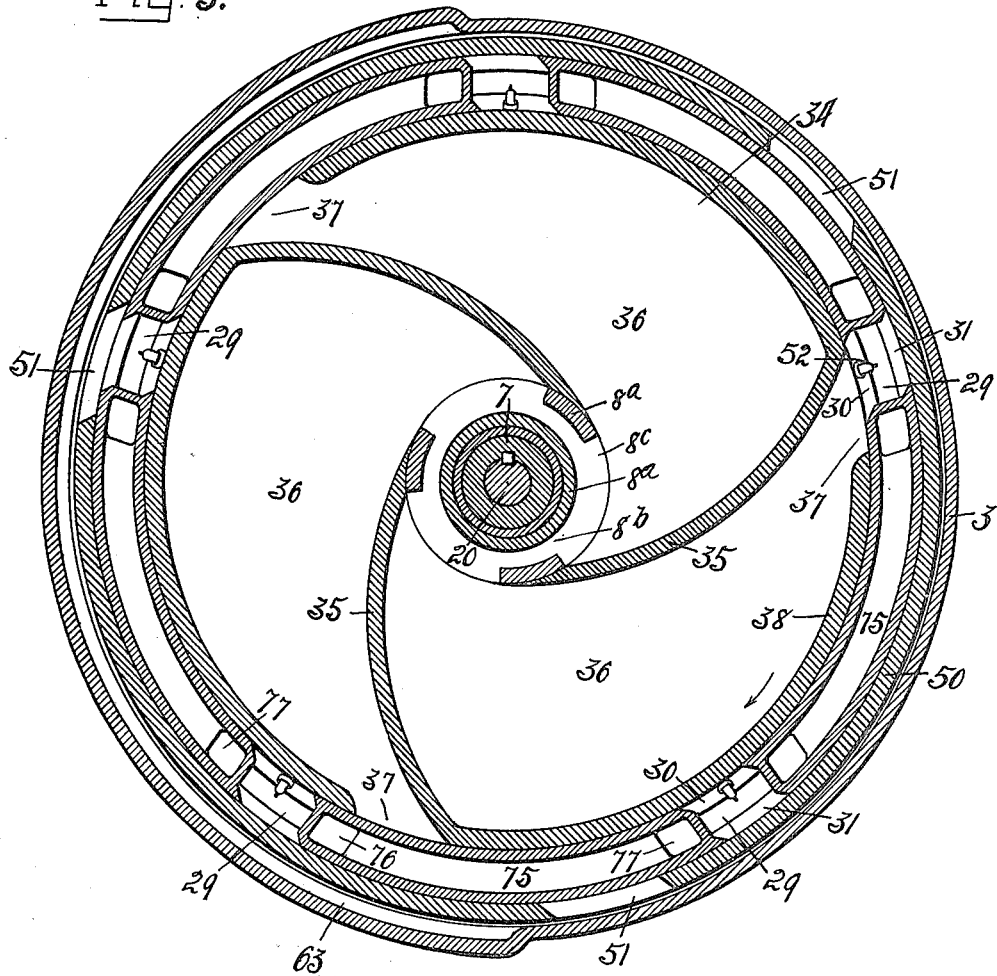
Figure 4:
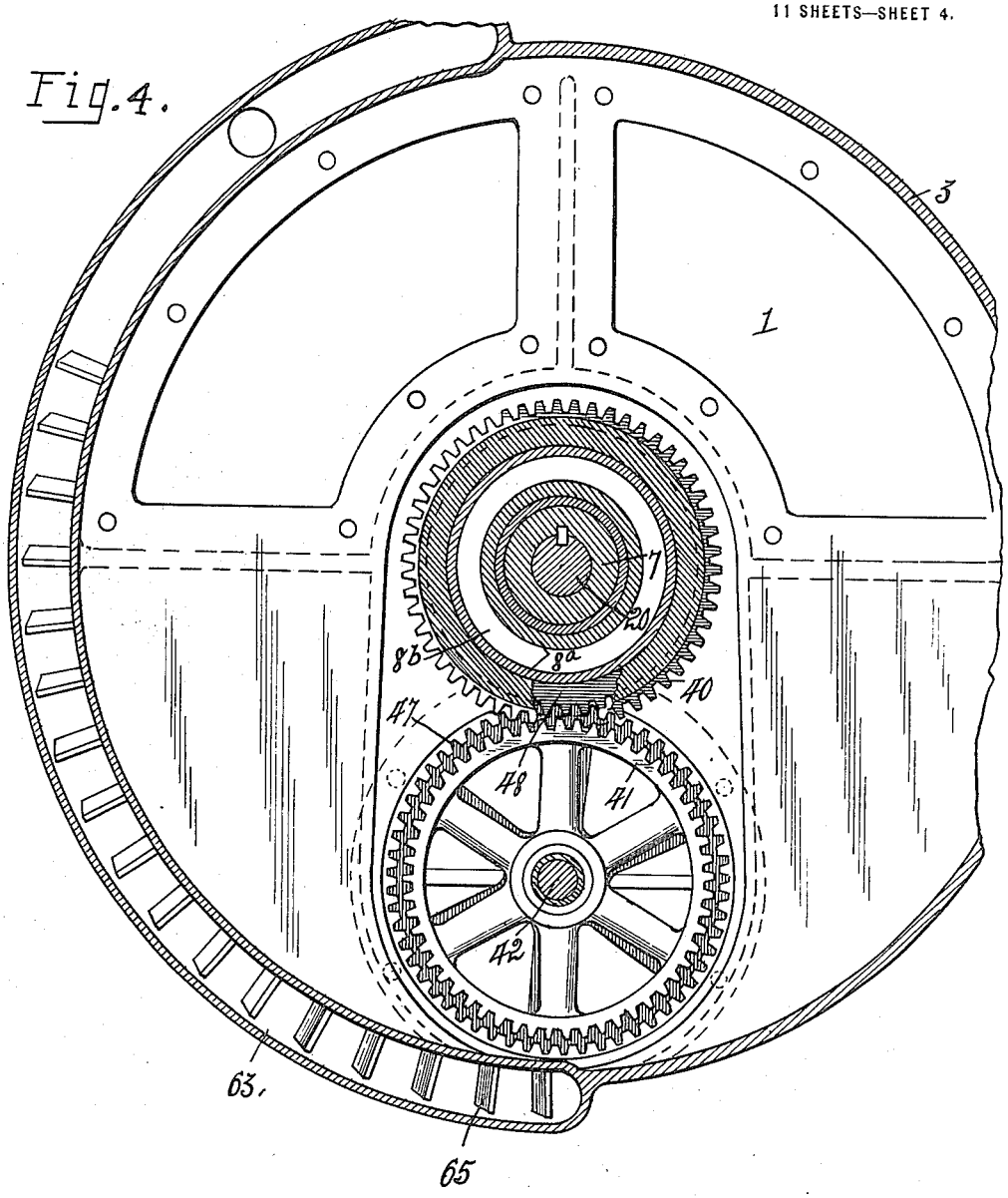
Figure 5:
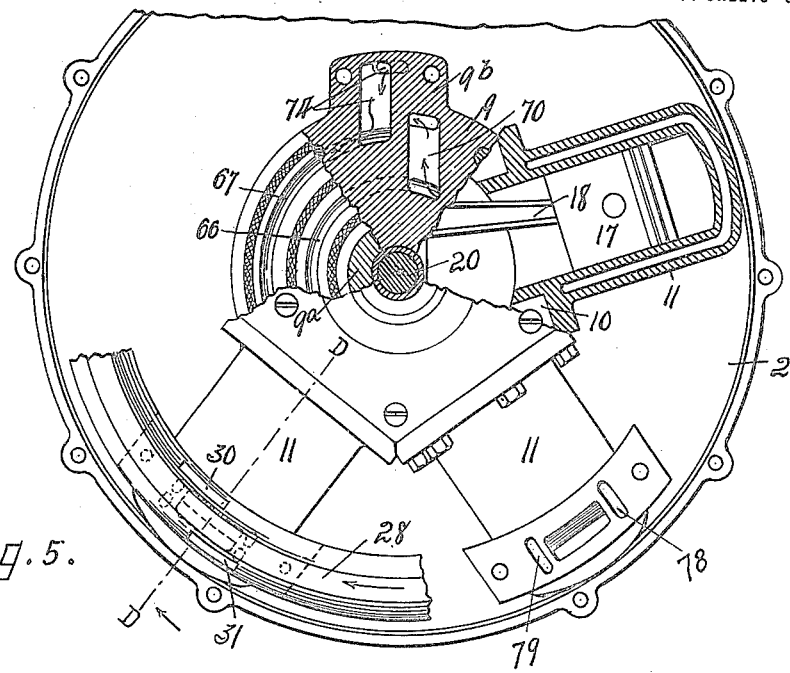
Figure 6:
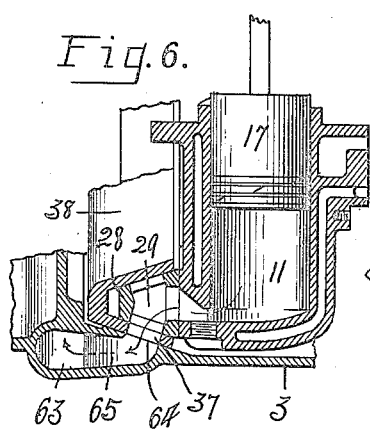
Figure 7:
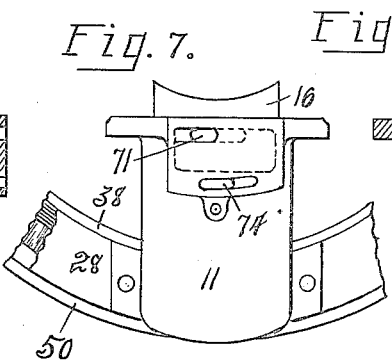
Figure 8:
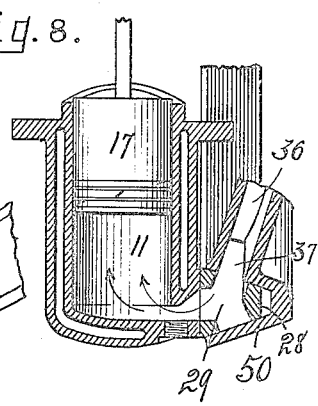
Figure 9:
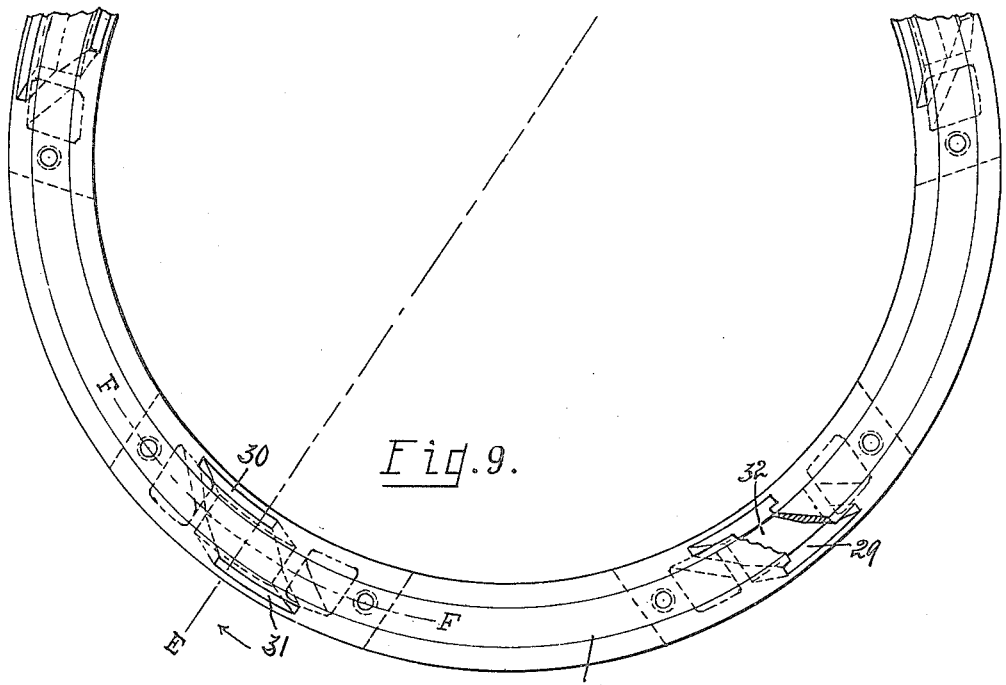
Figure 10:
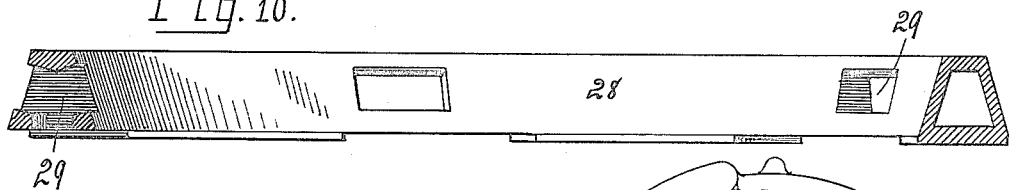
Figure 11:
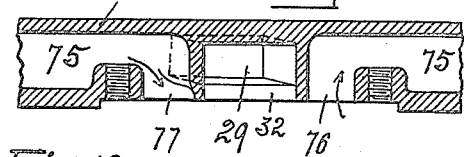
Figure 13:
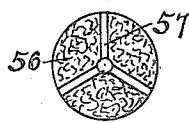
Figure 12:
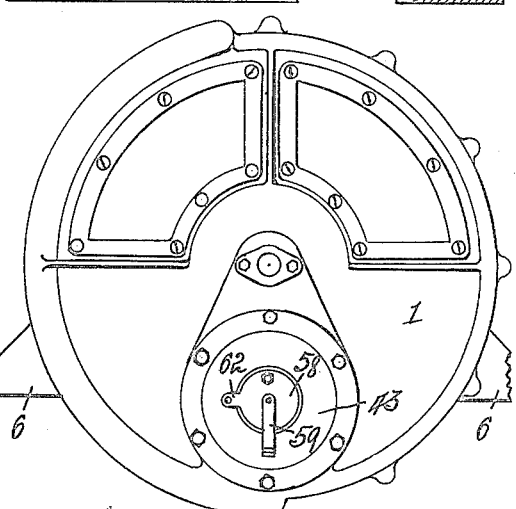
Figure 17:
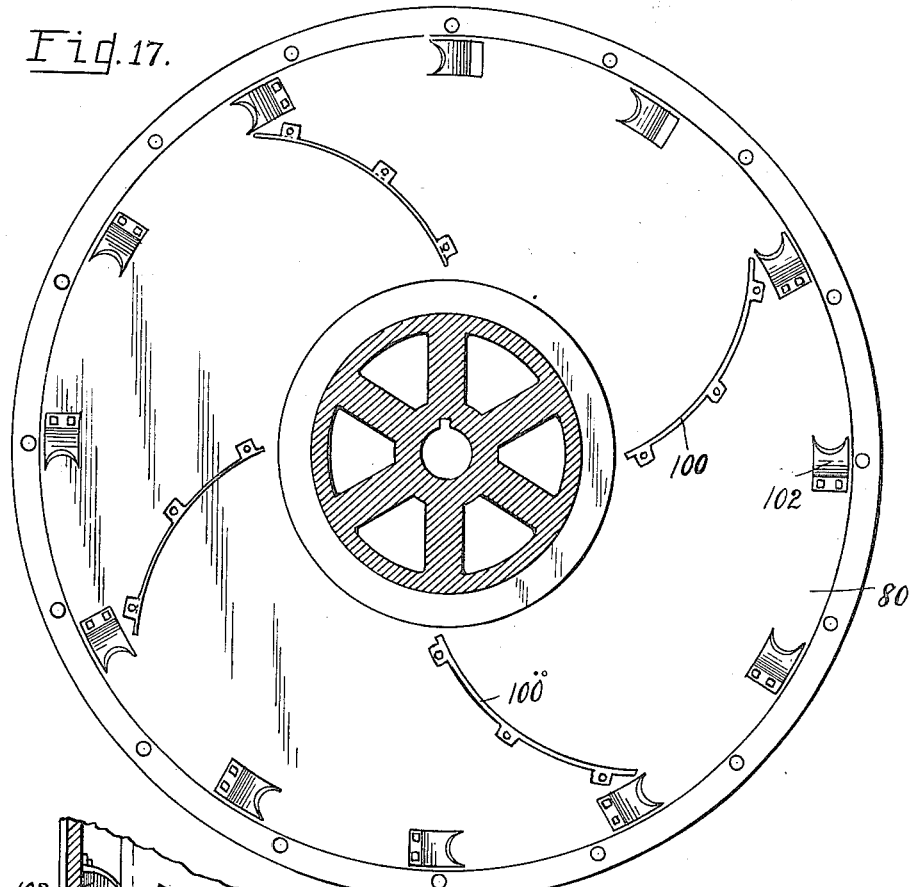
Figure 18:
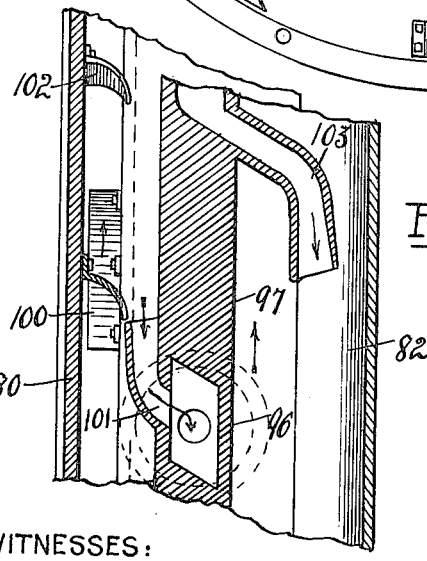

Figure 1 is a central vertical section of an engine embodying the preferred form of the invention taken on the line E—E in Fig. 2. Fig. 1ª is a view of one of the electrodes of the engine. Fig. 2 is a section on the line C—C in Fig. 1, with parts in full. Fig. 3 is a section on the line E—E in Fig. 1. Fig. 4 is a section on the line D—D in Fig. 1. Fig. 5 is a broken sectional view with different parts in section on the lines A—A, B—B and C—C in Fig. 1, and with two cylinders in full with the port-ring removed from one. Fig. 6 is a section of a cylinder and associated parts in exhausting position taken on the line D—D in Fig. 5. Fig. 7 is a right hand side elevation of a cylinder together with portions of the port-ring fixed thereto and of the rotary valve in which such ring travels. Fig. 8 is a section of a cylinder and associated parts in charge receiving position. Fig. 9 is an outer side elevation of a portion of the port-ring of the cylinders. Fig. 10 is a section thereof on the line E—E in Fig. 9. Fig. 11 is a section of the port-ring on the line F—F in Fig. 9. Fig. 12 is a reduced left hand side elevation of the motor. Fig. 13 is a face view of the timing disk of the ignition system. Fig. 14 is a sectional view of the motor in diagrammatical form illustrating the relative action of the parts. Fig. 15 is a vertical cross-section of a modified form of the motor. Fig. 16 is a partial section on the line E—E in Fig. 15. Fig. 17 is a section on the line G in Fig. 15. Fig. 18 is a partial segmental section on the line H—H in Fig. 15. Fig. 19 is a central vertical section of the motor shown in Fig. 15 taken crosswise of its axis. Fig. 20 is a diagrammatical section illustrative of the action of the motor, and Figs. 21 and 22 are diagrammatic views illustrative of both forms of the invention with the first following out the working and exhaust revolution of a cylinder and the latter following out the gas intake and compression revolution of a cylinder.

In the preferred form of my invention the motor housing (particular reference being had to Fig. 1) is shown as comprising the opposed sides 1 and 2, which coöperate with a laterally-projecting peripherally-disposed flange 3 on the side 1 to form a chamber 4 in which the rotor and other parts of the motor are mounted. The side 2 is secured at its edge to the free edge of the flange 3 by screws 5, or in any other suitable manner. The housing part 1—3 is provided at opposite sides thereof with outwardly projecting bosses 6 (Fig. 12) for resting on any suitable frame work. Projecting within the chamber 4 from the housing side 1 substantially axially thereof is a hollow stationary shaft 7, which terminates in spaced relation to the opposite side 2 of the housing.

The rotor of the engine comprises, in the present instance, the two opposing sides or hub-disks 8 and 9, and the ring 10, which rigidly connects the marginal edge portions of the hub-disks and carries the rigidly disposed radial cylinders 11 in equi-distantly spaced relation therearound. The ring 10 seats at its edges upon respective inwardly projecting annular flanges 12 of the disk-hubs 8, 9 and is rigidly fixed to said hubs, in the present instance, by screws 13. In the motor illustrated the cylinders 11 are five in number and the outer periphery of the ring 10 is therefore made in the form of a pentagon to provide five seats for the base portions of the cylinders, the cylinders being rigidly secured thereto by screws 14 (Fig. 2) or in any other suitable manner. The inner ends of the cylinders 11 open into the interior of the ring 10 through registering openings 15 provided in the ring for such purpose. It is preferable to provide the cylinder with a flange 16 at its inner end for fitting into the ring opening, as a more rigid and practical connection between the ring and cylinders is thereby secured.

Each cylinder 11 has a piston 17 working therein, and such piston is connected by a piston-rod 18 to the wrist-pin 19 of a crank, which is disposed within the ring 10 or crank chamber of the rotor eccentric thereto and is common to all of the pistons. In order to adapt the several piston-rods 18 to engage at their inner ends with the wrist-pin, one rod is connected to the center of the wrist-pin and the other rods have their inner ends forked to straddle the center rod and the forked ends of each other, as shown in Fig. 1. It will of course be understood that the piston-rods can be connected to the wrist-pin in any other suitable manner, as may be found convenient or desirable.

The wrist-pin 19 is stationary relative to the motor housing and has its crank-arms provided at their inner ends with outwardly projecting trunnions 20, one having a fixed bearing in the adjacent end of the hollow stationary shaft 7 and the other having a loose bearing in a bearing sleeve 21, which is fitted into the inner end of an axial opening 22 in the disk-hub 9 of the rotor. The trunnion 20, which projects into the stationary shaft 7, is secured against turning therein by one or more keys 23.

The rotor is mounted for free rotation within the chamber 4 of the housing by having its disk-hub 8 provided with an outwardly projecting bearing flange or sleeve 8$^a$ which is suitably journaled on the inner end portion of the stationary shaft 7 for free rotation thereon, while the hub-disk 9 is provided around its opening 22 with an outwardly projecting bearing flange 9$^a$, which is suitably journaled in an axial opening 24 in the housing side 2. It is thus evident that the inner end of the stationary shaft 7 is exposed to the crank chamber of the rotor, thus enabling the adjacent trunnion 20 of the crank to be fitted into said shaft. The motor shaft is indicated at 25, being rigidly fixed at one end within the hub-disk flange 9$^a$ in any suitable manner and projecting axially therefrom.

Bolted or otherwise suitably secured to and, in the present instance, fixedly connecting the outer end portions of the several cylinders 11 of the rotor, at one side thereof, is what may be termed a "port-ring" 28, which is provided for each cylinder with a three-way port 29 having the inlet opening 30, the exhaust opening 31 and the cylinder opening 32, which latter is continued through the wall of the respective cylinder and opens into the combustion end thereof. The port-ring 28 also forms a portion of the water circulating system, as hereinafter described, and is therefore made hollow intermediate the end walls of adjacent three-way ports 29. The port-ring 28 preferably has its inner and outer sides, with respect to the rotor axis, oppositely tapered to narrow the ring outwardly from the cylinders and to adapt it to have a close sliding fit into the registering V-shaped or complemental recess 33 in the outer rim portion of a rotary valve 34, said recess being of annular form and opening toward the cylinders. The provision of the V-shaped interengaging portions of the valve and port-ring provides a compensating wearing fit between such parts.

The rotary valve 34 is loosely mounted on the bearing flange 8ᵃ of the rotor hub-disk 8 concentric thereto, and has its web, or the portion thereof which connects its hub and outer recessed portion, hollow except for the provision, in the present instance, of three partitions 35 therein, which partitions divide the interior of the valve web into three charge chambers or passages 36 (Fig. 3). The inner ends of the passages 36 are in permanent communication with an annular chamber 8ᵇ in the hub-disk flange 8ᵃ through a plurality of outwardly opening ports 8ᶜ in said passage, and the passage 8ᵇ in turn has permanent communication with the passage 7ᵃ through the stationary shaft 7 through registering radial ports 7ᵇ in said shaft, said ports being disposed without the end of the adjacent crank trunnion 20 (see Fig. 1). The passage 7ᵃ in the shaft 7 is intended to have communication with a suitable carbureting system or other source of fuel supply. The arrangement of the ports 7ᵇ and 7ᶜ is such that the passage 8ᵇ is in permanent communication both with the supply passage 7ᵃ in the stationary shaft 7 and with the chambers or passages 36 in the rotary valve during a rotation of the bearing flange 8ᵃ around the shaft 7 and a rotation of the valve 34 around said bearing flange. The purpose of the partitions 35 within the hollow of the valve web is to provide fan blade parts, which serve as a pump during a rotation of the valve to effect an outward forcing of the gases by centrifugal action through the valve outlet ports 37 and a consequent circulation through the gas supply system. The ports 37, in the present instance, are three in number, and disposed in the wall 38 which separates the chambers 36 from the recess 33 into which the port-ring 28 projects. To facilitate a directing of the gases which are within the chambers 36 toward the outlet ports 37 thereof, the partitions 35 extend in a spiral manner from the bearing flange 8ᵃ to the wall 38 in a rearwardly extending direction, relative to the direction of rotation of the valve, and the port for each valve chamber 36 is disposed at the outer rear portion of its chamber, as readily understood by reference to Fig. 3.

The valve 34 is provided with an outwardly projecting hub part or flange 39, which carries a spur gear 40, said gear being in mesh with and driven by a spur gear which is fixed to a counter-shaft 42 (Figs. 1 and 4). The shaft 42 is disposed, in the present instance, below the stationary shaft 7 and has one end suitably journaled in a removable plate 43, which removably closes an opening in the housing side 1 and forms a part of such side, while the other end of the shaft 42 is journaled in a web or partition 44 within the housing. The shaft 42 carries a second gear 47 in mesh with a gear 48, which is fixed to the outer end portion of the rotor hub flange 8ᵃ. The gearing connection between the rotary valve 34 and the rotor is such, in the case of a five cylinder motor and the arrangement of ports as shown, as to cause the rotary valve to be driven five-sixths as rapidly as the driving of the rotor, i. e., the rotor makes six revolutions to each five revolutions of the rotary valve. An end-thrust roller bearing 49 is shown as being provided between the adjacent ends of the gear 48 and the hub flange 39 of the rotary valve. A collar 48ᵃ is mounted on the outer end of the hub flange 8ᵃ without the gear 48 and is adjustable longitudinally of such flange to act on the valve flange 39, through the medium of the gear 48 and bearing 49, which are slidable on the hub flange, to force the valve toward the rotor to compensate for wear between the parts 28 and 38, as is apparent by reference to Fig. 1. Access to the collar 48ᵃ for the purpose of adjustment may be had by removing the plate 43 from the casing opening.

In a five cylinder engine, such as shown, the rotary valve 34 is preferably provided in its wall 38 with three equidistantly spaced ports 37, which form the outlet ports for the charges from the interior of the rotary valve and periodically register with the respective inlet ports 30 of the port-ring 28 to admit charges to respective cylinders at predetermined intervals during a running of the motor, as hereinafter more fully described. The valve is also provided in its rim portion 50, which forms the outer wall of the recess 33, with a series of equidistantly spaced exhaust ports 51 corresponding in number to the ports 37 of the valve, with an exhaust port disposed at the rear of such inlet port, relative to the direction of rotation of the valve, in approximately the relation shown in Figs. 3 and 4. These exhaust ports are intended to register with the exhaust ports 31 of the port-ring 28 at predetermined intervals during a running of the motor, as hereinafter more fully described. The combined lengths of two ports 30 and 37 of the port-ring 28 and rotary valve 34, respectively, are preferably such, when considered in connection with the differential movements of the valve and port-ring, that an inlet port of the port-ring will be open to a respective chamber 36 of the valve through the port 37 for approximately one-half of a revolution of the rotor. This is also true of the exhaust ports 31 and 51 of the port-ring and valve, respectively, as it is preferable to maintain such ports in register during a complete exhaust stroke of a piston, or in other words, during approximately one-half of a revolution of the rotor, thereby permitting a complete exhaust of all burnt gases from a cylinder during the exhaust stroke of its piston. Each of the inlet and exhaust ports 30 and 31 of the port-ring is preferably shorter, circumferentially of the ring, than the length of the respective ports 37 and 51 of the rotary valve, so that the inlet and exhaust passages to and from the cylinder may each be entirely opened during portions of the respective revolutions of the rotor, as indicated by the space between the lines $a$—$b$ in Fig. 21 for the exhaust, and by the space between the lines $a$—$b$ in Fig. 22 for the inlet, as will be hereinafter more fully described.

The port-ring 28 is provided with three sets of sparking points or electrodes 52, a set being associated with each three-way port 29 thereof, with the points of the set disposed in proper spaced relation therein to provide a jump spark within the port when a set of electrodes is in circuit with a source of electrical supply. One electrode, the inner one in the present instance, of each set is electrically connected to the port-ring, whereby current passes from such electrode through the metal parts of the motor to a timer device hereinafter described, and is then grounded. The other electrode of a set is insulatingly carried by the reduced edge portion of the port-ring 28 in position to receive a jump-spark from an electrode 53 when in register therewith, said electrode 53 being carried by the rotary valve 34 at the inner or reduced end of the recess 33 thereof and being one of a set of three electrodes with which the valve is provided. A single stationary electrode 54 is provided at a point in the housing where it is desired to have the explosions take place, such electrode being carried by a plug 55 that is threaded into an opening provided therefor in the housing. The electrode 54 is disposed in position for a spark to jump across the space between it and any one of the electrodes 53 when the outer end of such electrode moves into register with the stationary electrode. In order that the sparks, which jump from the electrode 54 to a registering electrode 53 and from it to the insulated electrode of the set 52, may be of a prolonged nature the outer ends of the insulated electrode 52 and the electrode 53 are made of arcuate form (see Fig. 1ª) in concentric relation to the rotor axis, so that the sparking of each set 52 will occur during a predetermined portion of a revolution of the rotor. The multiple arcing between the different electrodes of a set when in register with the stationary electrode tends to intensify the arc or flash occurring between the points of the port-ring set 52. The stationary electrode 54 has connection without the motor with a suitable source of electrical supply, as for instance, a battery. It will be understood that the sparking means herein described and shown is merely illustrative of one form of such means, and that any other suitable ignition means may be provided as desired.

The timer for the ignition system comprises, in the present instance, a rotary disk 56, of fiber or other suitable insulating material, which is fixed to the outer end of the shaft 42 without the plate 43 and carries a three-arm contact spider 57 on its outer face, this spider being of brass or other suitable electrical conductive material and having its arms radially disposed and equidistantly spaced around its axis and of approximately one-half inch in width. A cap 58 is fitted over the disk 56 in rotatable contact at its inner edge with the plate 43, being yieldingly held in position over the timer disk by a spring finger 59, which is secured to the plate 43 and has its other end provided with a detent, which receives a pivot stud 60, provided axially on the outer side of the cap 58, thus yieldingly holding the cap in rotatable contact with the plate 43. An electric-brush 61 is insulatingly carried by the cap 58 at one side of its axis and yieldingly bears against the outer face of the timer disk 56 in position to have successive contact with the arms of the spider 57 as the timer disk is rotated. The current which passes through the brush 61, as it successively has contact with the arms of the spider 57, is grounded through a ground wire (not shown), which is suitably connected to the outer end of the brush. The rotary cap 58 has a lug 62 (Fig. 12) projecting radially from one edge thereof and in connection with any suitable control means (not shown), whereby the cap may be rotated to move the brush 61 about the cap axis to effect an advancing or a retarding of the spark, as desired.

The commencement of the exhaust in the motor illustrated takes place when the piston of a cylinder has reached the end of its outward or power stroke, or in other words, at a point which is approximately diametrically opposite the sparking point, and such exhaust continues during approximately one-half of a revolution of the cylinder or during the full exhaust stroke of the associated piston. To accommodate such exhaust the housing part 1—3 is provided substantially half-way around its periphery with a segmental exhaust chamber or passage 63 (Figs. 1, 3 and 4), one side edge of which is provided throughout its length with an inlet port 64 with which each of the exhaust ports 51 in the rotary valve registers during approximately one-half of its revolution. It is preferable to provide a series of spaced baffle blades or partitions 65 within the exhaust passage 63, for a desired distance therearound from the inlet end thereof, said baffle blades extending on an incline partly across the passage 63 from the inlet port 64 thereof. The incline of the baffle blades 65 is the reverse to the natural direction of flow of the exhaust gases through the exhaust passage 63, to tend to retard and baffle such exhaust and also to muffle it. The exhaust striking against the baffle blades will also tend to propel the rotor due to the resultant reaction.

The cooling system illustrated in connection with the preferred form of my motor will now be briefly described. The side 2 of the motor housing is provided in the inner side concentrically around the rotor axis with the two annular recesses or channels 66 and 67, the inner channel 66, in the present instance, having communication through an outwardly extending passage 68 with a suitable source of water supply, and the other having an outlet passage, as at 69, connected to any suitable drainage means. The inner side of each of the passages 66 and 67 is open and registers at a continually changing point therein, during a rotation of the rotor, with an inlet passage 70 provided in the hub disk 9 and in a radial extension 9$^b$ thereof for each cylinder, whereby each of said passages 70 is in continual register at its inner end with the supply passages 66 in the housing during a rotation of the rotor. Each passage 70 communicates at its outer end through a passage 71 in the base portion of the associated cylinder with a portion 72 of the water jacket space around the cylinder. The other channel 67 in the housing has continual communication with the other portion 73 of a cylinder water space through a passage 74 leading through a portion of the hub-disk 9 and the associated cylinder, as shown in Figs. 1, 5 and 7. The port-ring 28 is hollow, or has a passage 75 therein, between successive three-way ports 29, and each of such passages is provided at one end with an inlet port 76 and at its other end with an outlet port 77. The ports 76 and 77 are disposed at opposite ends of the interposed three-way ports 29 for the respective cylinders and register with ports 78 and 79, respectively, (Fig. 5) which communicate with the water jacket spaces 72 and 73, respectively, of a cylinder. It is thus evident that the circulation of water is from the supply channel 66 in the housing through the passages 70—71 and into the portion 72 of the jacket water space of a cylinder, thence outward from such portion into the associated channel 75 of the port-ring 28 through the ports 78—76, thence through the ring passage 75 in counter-clockwise direction, or in a direction opposed to the direction of rotation of such ring, thence passing from the opposite end of such passage through the port 77 and associated cylinder port 79 into the return water space 73 of the next cylinder in order, the water then passing from the space 73 of said cylinder into the drainage passage 67 of the housing. It is thus evident that the water first passes through a portion of one cylinder water jacket and thence through the port-ring 28 and the return portion of the water jacket of the next cylinder in order before draining from the motor. The circulation of the water in this manner is maintained by the fan action of the port-ring 28 thereon. This water circulating system is only briefly described, as no claim for the same is made herein, the subject matter thereof being reserved for a subsequent application. It will be evident that if it were not for the port-ring 28 forming a portion of the water circulating system for the cylinders that such ring could be made solid between the three-way ports 29.

The operation of the preferred form of the motor is illustrated in a diagrammatical manner in Figs. 14, 20, 21 and 22. The explosions successively take place in alternate cylinders, as for instance, as indicated by the reference numerals 1, 2, 3, 4, 5 applied to the cylinders in these figures. The motor being of the four cycle type, each cylinder makes two revolutions during a cycle of operations, a charge being drawn into a cylinder during one-half and compressed therein during the next half of one revolution and the explosion taking place at the beginning of the first half of the second revolution, the working stroke continuing throughout such first half of the second revolution and the exhaust taking place during approximately the entire remaining half of the second revolution. This action is best illustrated by reference to Figs. 21 and 22, the latter being illustrative of the first revolution of a cylinder, and the former illustrative of the second revolution of a cylinder during a cycle thereof. From Fig. 22 it will be noted that a valve inlet port 37 opens to a cylinder through the cylinder port approximately at the time the longitudinal center of the cylinder has reached the point at which the explosion took place at the previous revolution, or at the beginning of the first revolution of a cycle of the cylinder at which position the piston is at its highest point, and that such ports remain in communication until the piston of such cylinder has completed its suction stroke, the ports being in full open register during substantially one-third of the stroke or approximately during a movement of the cylinder axis between the radial lines a—b. The charge is then compressed in the cylinder during the next out stroke of the piston. The explosion of the compressed charge occurs at approximately the point of completion of the first revolution of the cylinder, and the working stroke of the piston takes place during the entire first half of the second revolution of the cylinder. When the cylinder has completed the first half of its second revolution, the cylinder port will have caught up with an exhaust port 51 in the valve, as noted at the bottom of Fig. 21. The exhaust then takes place throughout approximately the entire exhaust stroke of the piston, or the last half of the second revolution of the cylinder, the exhaust ports being in full register during approximately one-half of the exhaust stroke or during a movement of the cylinder axis substantially between the radial lines a—b (Fig. 21). It will of course be understood that at the time an explosion takes place in a cylinder the set of sparking points or electrodes 52 for such cylinder, an electrode 53 of the rotary valve and the stationary electrode 54 in the housing will have moved into register, as indicated in Figs. 1, 21 and 22.

In the modified form of the motor illustrated in Figs. 15 to 20, 80 and 81 designate the opposite sides of the housing, the side 81 being formed around its peripheral portion with an inwardly opening exhaust passage 82 and having a laterally projecting flange 83, which is fixedly secured in any suitable manner to the outer edge of the side 80. The rotor is provided with an internal crank-chamber 84, and has its cylinders 85 radiating therefrom in equidistantly spaced relation. The hub portion of the rotor at one side of the crank chamber 84 is loosely journaled on a stationary shaft 86, which is fixed in a housing-bearing 87, while the opposite hub portion of the rotor is provided with an outwardly projecting trunnion part 88, which journals in a bearing 89 in the adjacent housing side. The motor shaft 90 is fixed to this latter side of the rotor hub and projects outwardly through the housing bearing. The pistons 91 in the cylinders are connected in any suitable manner by piston-rods 92 to a common crank 93, said crank being stationary relative to the housing and having an arm which is fixed to the inner end of the stationary shaft 86 and an arm provided with a trunnion 94, which is loosely journaled in an axial bearing in the adjacent hub side of the rotor. Fixed, in the present instance, to the rotor, circumferentially thereof, is a ring 95, which closes the outer ends of the cylinders 85, except for the cylinder port 96 provided therein for each cylinder. The ring 95 performs the same function in this form of the motor as the ring 28 in the preferred form of the motor.

The rotary valve, which is designated 97, is of annular form and is mounted on the rotor-ring 95 for free rotation relative thereto. This valve fits closely between the rotor-ring 95 and the peripheral flange 83 of the housing in a manner to permit it to freely rotate relative to both the rotor and housing, closing communication between the portions of the housing chamber at opposite sides of the rotor. The left hand side of the housing chamber forms a gas distributing chamber for the motor, gas suitable for use within the motor being admitted thereto, as through a pipe 99. Fan plates 100 on the adjacent side of the rotor serve as a pump to force the gas outwardly toward the peripheral portion of the distributing chamber when the engine is running.

The valve 97 is provided at the distributing chamber side thereof, in the present instance, with three equidistantly spaced inlet ports or passages 101, which open communication between said chamber and the cylinder ports 96 in the ring 95 when a cylinder is receiving its charge, the registering portions of the ports 96 and 101 being so proportioned that they will remain in communication during approximately one-half of a revolution of the rotor, or preferably during the complete suction stroke of the associated piston (Fig. 18). The inlet ends of the valve ports 101 are preferably extended in the direction of rotation of the rotor, as shown in Fig. 18, and an annular series of stationary fins 102, which are fixed to the inner side of the housing side 80, assist in directing the gas into the passage 101 during a running of the motor.

The valve 97 is provided in the exhaust side thereof with three equidistantly spaced exhaust ports or passages 103, which have their outlet ends opening into the exhaust passage 82 in the housing in a direction reverse to the direction of rotation of the rotor, as indicated in Fig. 18, whereby the movement of the rotor facilitates the exhaust. The exhaust ports 103 are so disposed that one of such ports moves into and remains in register with a cylinder port 96 during approximately the entire exhaust stroke of the piston in such cylinder.

Three electrodes 104 are insulatingly carried within openings 98 in the valve 97 in equidistantly spaced relation and in suitable relation to the inlet and exhaust ports thereof to secure an explosion within each cylinder at a predetermined point in each cycle thereof, as illustrated in Fig. 19. An electrode 104ª extends, in the present instance, across each cylinder port 96 in the direction of rotation of the rotor and is of of which is provided throughout its length with an inlet port 64 with which each of the exhaust ports 51 in the rotary valve registers during approximately one-half of its revolution. It is preferable to provide a series of spaced baffle blades or partitions 65 within the exhaust passage 63, for a desired distance therearound from the inlet end thereof, said baffle blades extending on an incline partly across the passage 63 from the inlet port 64 thereof. The incline of the baffle blades 65 is the reverse to the natural direction of flow of the exhaust gases through the exhaust passage 63, to tend to retard and baffle such exhaust and also to muffle it. The exhaust striking against the baffle blades will also tend to propel the rotor due to the resultant reaction.

The cooling system illustrated in connection with the preferred form of my motor will now be briefly described. The side 2 of the motor housing is provided in the inner side concentrically around the rotor axis with the two annular recesses or channels 66 and 67, the inner channel 66, in the present instance, having communication through an outwardly extending passage 68 with a suitable source of water supply, and the other having an outlet passage, as at 69, connected to any suitable drainage means. The inner side of each of the passages 66 and 67 is open and registers at a continually changing point therein, during a rotation of the rotor, with an inlet passage 70 provided in the hub disk 9 and in a radial extension $9^b$ thereof for each cylinder, whereby each of said passages 70 is in continual register at its inner end with the supply passages 66 in the housing during a rotation of the rotor. Each passage 70 communicates at its outer end through a passage 71 in the base portion of the associated cylinder with a portion 72 of the water jacket space around the cylinder. The other channel 67 in the housing has continual communication with the other portion 73 of a cylinder water space through a passage 74 leading through a portion of the hub-disk 9 and the associated cylinder, as shown in Figs. 1, 5 and 7. The port-ring 28 is hollow, or has a passage 75 therein, between successive three-way ports 29, and each of such passages is provided at one end with an inlet port 76 and at its other end with an outlet port 77. The ports 76 and 77 are disposed at opposite ends of the interposed three-way ports 29 for the respective cylinders and register with ports 78 and 79, respectively, (Fig. 5) which communicate with the water jacket spaces 72 and 73, respectively, of a cylinder. It is thus evident that the circulation of water is from the supply channel 66 in the housing through the passages 70—71 and into the portion 72 of the jacket water space of a cylinder, thence outward from such portion into the associated channel 75 of the port-ring 28 through the ports 78—76, thence through the ring passage 75 in counter-clockwise direction, or in a direction opposed to the direction of rotation of such ring, thence passing from the opposite end of such passage through the port 77 and associated cylinder port 79 into the return water space 73 of the next cylinder in order, the water then passing from the space 73 of said cylinder into the drainage passage 67 of the housing. It is thus evident that the water first passes through a portion of one cylinder water jacket and thence through the port-ring 28 and the return portion of the water jacket of the next cylinder in order before draining from the motor. The circulation of the water in this manner is maintained by the fan action of the port-ring 28 thereon. This water circulating system is only briefly described, as no claim for the same is made herein, the subject matter thereof being reserved for a subsequent application. It will be evident that if it were not for the port-ring 28 forming a portion of the water circulating system for the cylinders that such ring could be made solid between the three-way ports 29.

The operation of the preferred form of the motor is illustrated in a diagrammatical manner in Figs. 14, 20, 21 and 22. The explosions successively take place in alternate cylinders, as for instance, as indicated by the reference numerals 1, 2, 3, 4, 5 applied to the cylinders in these figures. The motor being of the four cycle type, each cylinder makes two revolutions during a cycle of operations, a charge being drawn into a cylinder during one-half and compressed therein during the next half of one revolution and the explosion taking place at the beginning of the first half of the second revolution, the working stroke continuing throughout such first half of the second revolution and the exhaust taking place during approximately the entire remaining half of the second revolution. This action is best illustrated by reference to Figs. 21 and 22, the latter being illustrative of the first revolution of a cylinder, and the former illustrative of the second revolution of a cylinder during a cycle thereof. From Fig. 22 it will be noted that a valve inlet port 37 opens to a cylinder through the cylinder port approximately at the time the longitudinal center of the cylinder has reached the point at which the explosion took place at the previous revolution, or at the beginning of the first revolution of a cycle of the cylinder at which position the piston is at its highest point, and that such ports remain in communication until the piston of such cylinder has completed its suction stroke, the ports being in full open register during substantially one-third of the stroke or approximately during a movement of the cylinder axis between the radial lines *a—b*. The charge is then compressed in the cylinder during the next out stroke of the piston. The explosion of the compressed charge occurs at approximately the point of completion of the first revolution of the cylinder, and the working stroke of the piston takes place during the entire first half of the second revolution of the cylinder. When the cylinder has completed the first half of its second revolution, the cylinder port will have caught up with an exhaust port 51 in the valve, as noted at the bottom of Fig. 21. The exhaust then takes place throughout approximately the entire exhaust stroke of the piston, or the last half of the second revolution of the cylinder, the exhaust ports being in full register during approximately one-half of the exhaust stroke or during a movement of the cylinder axis substantially between the radial lines *a—b* (Fig. 21). It will of course be understood that at the time an explosion takes place in a cylinder the set of sparking points or electrodes 52 for such cylinder, an electrode 53 of the rotary valve and the stationary electrode 54 in the housing will have moved into register, as indicated in Figs. 1, 21 and 22.

In the modified form of the motor illustrated in Figs. 15 to 20, 80 and 81 designate the opposite sides of the housing, the side 81 being formed around its peripheral portion with an inwardly opening exhaust passage 82 and having a laterally projecting flange 83, which is fixedly secured in any suitable manner to the outer edge of the side 80. The rotor is provided with an internal crank-chamber 84, and has its cylinders 85 radiating therefrom in equidistantly spaced relation. The hub portion of the rotor at one side of the crank chamber 84 is loosely journaled on a stationary shaft 86, which is fixed in a housing-bearing 87, while the opposite hub portion of the rotor is provided with an outwardly projecting trunnion part 88, which journals in a bearing 89 in the adjacent housing side. The motor shaft 90 is fixed to this latter side of the rotor hub and projects outwardly through the housing bearing. The pistons 91 in the cylinders are connected in any suitable manner by piston-rods 92 to a common crank 93, said crank being stationary relative to the housing and having an arm which is fixed to the inner end of the stationary shaft 86 and an arm provided with a trunnion 94, which is loosely journaled in an axial bearing in the adjacent hub side of the rotor. Fixed, in the present instance, to the rotor, circumferentially thereof, is a ring 95, which closes the outer ends of the cylinders 85, except for the cylinder port 96 provided therein for each cylinder. The ring 95 performs the same function in this form of the motor as the ring 28 in the preferred form of the motor.

The rotary valve, which is designated 97, is of annular form and is mounted on the rotor-ring 95 for free rotation relative thereto. This valve fits closely between the rotor-ring 95 and the peripheral flange 83 of the housing in a manner to permit it to freely rotate relative to both the rotor and housing, closing communication between the portions of the housing chamber at opposite sides of the rotor. The left hand side of the housing chamber forms a gas distributing chamber for the motor, gas suitable for use within the motor being admitted thereto, as through a pipe 99. Fan plates 100 on the adjacent side of the rotor serve as a pump to force the gas outwardly toward the peripheral portion of the distributing chamber when the engine is running.

The valve 97 is provided at the distributing chamber side thereof, in the present instance, with three equidistantly spaced inlet ports or passages 101, which open communication between said chamber and the cylinder ports 96 in the ring 95 when a cylinder is receiving its charge, the registering portions of the ports 96 and 101 being so proportioned that they will remain in communication during approximately one-half of a revolution of the rotor, or preferably during the complete suction stroke of the associated piston (Fig. 18). The inlet ends of the valve ports 101 are preferably extended in the direction of rotation of the rotor, as shown in Fig. 18, and an annular series of stationary fins 102, which are fixed to the inner side of the housing side 80, assist in directing the gas into the passage 101 during a running of the motor.

The valve 97 is provided in the exhaust side thereof with three equidistantly spaced exhaust ports or passages 103, which have their outlet ends opening into the exhaust passage 82 in the housing in a direction reverse to the direction of rotation of the rotor, as indicated in Fig. 18, whereby the movement of the rotor facilitates the exhaust. The exhaust ports 103 are so disposed that one of such ports moves into and remains in register with a cylinder port 96 during approximately the entire exhaust stroke of the piston in such cylinder.

Three electrodes 104 are insulatingly carried within openings 98 in the valve 97 in equidistantly spaced relation and in suitable relation to the inlet and exhaust ports thereof to secure an explosion within each cylinder at a predetermined point in each cycle thereof, as illustrated in Fig. 19. An electrode 104$^a$ extends, in the present instance, across each cylinder port 96 in the direction of rotation of the rotor and is of sufficient length to remain in arcing register with the valve electrode 104 during a predetermined period of relative movements of the valve and rotor. The outer end of each valve electrode 104 is broadened in the direction of rotation of the valve, as at 105 (Fig. 19), to permit it to remain in arcing relation to the electrode of a stationary plug 105ª during a predetermined period of rotation of the valve relative to the housing. The spark plug 105ª is attached to the housing at the point where it is desired to have the explosions take place.

The rotary valve and rotor are connected by a train of gears to communicate differential rotation from one to the other, the valve making five revolutions to each six revolutions of the rotor. The train of gears, in the present instance, is shown in Figs 15 and 16 as comprising the rotor gear 106, the annular internal valve gear 107 and the intermediate pinions 108, 109 and 110, the shafts of which fixedly project inwardly from the adjacent side of the housing.

The operation of this form of the motor is the same in principle as that of the form first described, the rotation of the valve being so timed and its ports so proportioned that a charge is admitted to each cylinder during one in or suction stroke of its piston, is then compressed during the succeeding out or compression stroke of the piston, and is then fired at the beginning of the succeeding power stroke of the piston, the exhaust taking place during approximately the complete exhaust stroke of the piston, as illustrated diagrammatically in Figs. 21 and 22.

By reference to Figs. 14, 19 and 20, which apply to both forms of the invention so far as the arrangement of ports and the action of the motor is concerned, and in which the same numbering of the cylinders is carried out with the cylinders at different points in their respective cycles, it will be noted that when an explosion occurs in cylinder No. 1 and during the power stroke of its piston, the piston in cylinder No. 2 is just finishing its power stroke, cylinder No. 3 is exhausting, cylinder No. 4 is taking in its charge and cylinder No. 5 is compressing. When cylinder No. 1 has reached the end of its power stroke it then opens to the exhaust (Fig. 20), cylinder No. 2 is just completing its exhaust stroke, cylinder No. 3 is taking in its charge, cylinder No. 4 is compressing, and cylinder No. 5 has started on its power stroke. By reference to Fig. 14 it will be noted that when cylinder No. 1 has made approximately one-half of its power stroke, cylinder No. 2 will be exhausting, both cylinders Nos. 3 and 4 will be taking in charges, and cylinder No. 5 will be compressing.

It is evident that a motor of the class described will permit the exhaust of all burnt gases from a cylinder before a charge is admitted, thereby very materially enhancing the efficiency of the motor over motors of the explosive type heretofore used, and also that a motor embodying my invention will be very greatly reduced in weight over other explosive engines having the same number, or even a lesser number, of cylinders. It will, of course, be understood that the two forms of my invention shown herein are merely illustrative of the invention and that such invention is not restricted to any particular construction and arrangement of the parts or to the number of cylinders employed, as numerous modifications and changes may be made within the spirit of the invention.

Having thus described my invention, what I claim as new, and desire to secure by Letters Patent, is,—

1. In a rotary engine, a rotor having a cylinder provided with a fluid inlet port, a rotary valve concentric to said rotor, said valve having means for taking fuel in at its center and discharging it without its center into the cylinder port periodically during a running of the engine, and means actuated by a running of the motor for driving said valve at a speed which is differential to the speed of rotation of the rotor.

2. In a rotary engine, a rotor having a cylinder provided with an inlet port, a rotary member operable to control the periodical admission of fluid to the cylinder through said port and having means enabling it to act by its rotation as a pump for forcing fluid into the cylinder, and means operable during a running of the motor to rotate said member at a speed which bears a predetermined ratio to the speed of rotation of the rotor.

3. The combination with a rotary motor having a revoluble cylinder provided with an inlet port, of a rotary element serving as a valve for periodically opening said port to the source of fluid supply and having means for forcing fluid into the cylinder through its port.

4. In an internal combustion engine, the combination with a rotor having a cylinder provided with an inlet port, of rotatable means operable during a running of the engine to periodically open the inlet port of the cylinder and having means to pump a charge therein.

5. In an internal combustion engine, the combination with a rotor having a cylinder provided with a charge inlet port, of a valve rotatable concentrically and differentially relative to the rotor during a running thereof and operable to periodically open said charge port and having means to pump a charge therein.

6. In an internal combustion engine, the combination with a rotor having a plurality of cylinders each provided with a charge inlet port, of means rotatable relative to said rotor during a running thereof for periodically opening the respective cylinder ports and including a centrifugal pump for pumping a charge into said ports when open.

7. In an internal combustion engine, the combination with a rotor having a plurality of cylinders each provided with an inlet port, of a rotatable valve member common to all of said cylinders for periodically uncovering the respective ports thereof during a running of the engine, said valve taking in its gas near its center and discharging it without its center into the cylinder ports when open and having internal means for imparting a centrifugal pumping action to the gas in its passage therethrough.

8. In a four cycle internal combustion engine, the combination with a rotor having a plurality of cylinders each provided with a port, of a rotary fuel pump for the engine having means for controlling the timed periodical admission of charges to and the exhaust of gases from the respective cylinders during a running of the engine.

9. In an internal combustion engine, the combination with a rotor having a plurality of cylinders each provided with an inlet port, of a rotary member having a centrally disposed gas intake and a plurality of radial passages leading outwardly from such intake and each passage having an outlet port for periodically registering with the cylinder inlet ports during a running of the engine, and means connecting the rotor and said member for imparting differential rotation to one from the other.

10. In an internal combustion engine, the combination with a rotor having a cylinder provided with means for the inlet to and exhaust of gases from the cylinder, of a rotary valve for controlling the inlet and exhaust of gases to and from said cylinder and having means for pumping a charge into the cylinder when its inlet port is open, and means operable during a running of the engine to drive said rotary means at a speed which bears a predetermined ratio to the speed of driving of the rotor.

11. In an internal combustion engine, the combination with a rotor having a plurality of cylinders each provided with an inlet port, of a rotary charge distributing valve having a plurality of charge exit ports for periodically registering with the cylinder ports in predetermined order for the timed delivery of charges to the cylinders, said valve having means forming a centrifugal pump for forcing the charges into the cylinders, and means operable during a running of the engine to rotate said rotary valve at a speed which is differential to but of fixed ratio relative to the rotor speed.

12. In an internal combustion engine, the combination with a rotor having a plurality of cylinders each provided with an inlet port, of a charge distributing valve having a plurality of exit ports less in number than the inlet ports of the several cylinders and adapted to periodically register with said cylinder ports, said valve having means serving as a pump for effecting a forced discharge of gases through the valve exit ports, and means operable during a running of the engine to rotate said charge distributing valve at a speed which bears a predetermined ratio to the speed of driving of the rotor whereby the cylinder ports are uncovered to the exit ports of the charge distributing valve in predetermined order.

13. In an internal combustion engine, the combination with a rotor having a plurality of cylinders each provided with an inlet port, of a rotatable charge distributing valve concentrically and differentially rotatable relative to the rotor during a running of the engine and having a plurality of exit ports which periodically register with and open the cylinder ports to a source of charge supply in predetermined order, and means forming a part of and rotatable with said valve to serve as a pump for effecting a forced exit of charges into the cylinders when the ports are open.

14. In a rotary engine, a revoluble cylinder having a port for the inlet and exhaust of gases, and movable means controlling said port and having, in annular series, an ignition device, an exhaust port and a gas inlet port which successively move into register with the cylinder port during a cycle thereof.

15. In a rotary engine, a revoluble cylinder having a port, and rotatable control means for said port having a different speed of movement than the speed of revolution of said cylinder, said control means having an annular series of ignition devices, an annular series of exhaust ports and an annular series of gas inlet ports and operable to successively place an ignition device, an exhaust port and an inlet port in register with the cylinder port at predetermined points in a cycle of the cylinder, and means for rendering each ignition device operable to fire a charge when it comes into register with the cylinder port.

16. In a rotary engine, a rotor having a plurality of radially disposed cylinders each provided at its outer end with a port, with the ports of the several cylinders in annular series, and common rotary control means for said ports having an annular series of ignition devices, an annular series of exhaust ports and an annular series of intake ports and automatically operable by a running of the engine to rotate said ignition devices, exhaust and inlet ports at a speed which is differential to the speed of rotation of said rotor whereby each cylinder port successively moves into register with an ignition device, an exhaust port and an inlet port at each cycle of the associated cylinder for the purpose of firing a charge, exhausting the burnt gases and taking in fresh gases, and means for rendering each ignition device operative to fire a charge when at a predetermined point in its movement.

17. In a four-cycle rotary engine, a rotor having a plurality of radially disposed cylinders each provided with a port, with the ports of the several cylinders in annular series, arcing points for each cylinder and movable therewith, a rotary valve having an annular series of ignition members, an annular series of exhaust ports and an annular series of intake ports, said valve being rotatable in concentric relation to the rotor, means operable by a running of the engine to rotate said valve at a speed which is different from the speed of rotation of the rotor whereby an ignition member, an exhaust and an intake port in the valve successively move into register with the port of each cylinder at predetermined points in a cycle thereof, and means operable through each ignition member to fire a charge in a cylinder when it reaches a predetermined point in each cycle of its movement.

18. In a rotary engine, a revoluble cylinder having a protuberant part forming an inlet and exhaust port for the cylinder, a rotary valve concentric to the axis of revolution of the cylinder and having an annular recess loosely receiving the protuberant part of the cylinder and having charge inlet and exhaust ports for register with the respective ports in said protuberant part, and means operable by a running of the engine to rotate said valve at a speed different from the speed of revolution of the cylinder to periodically move the ports in the valve into register with the ports in said protuberant part.

19. In a rotary engine, a revoluble cylinder having a protuberant part provided with gas inlet and exhaust ports in communication with the interior of the cylinder, a rotary valve having an annular recess loosely receiving said protuberant part and having a series of inlet ports and a series of exhaust ports, and means operable to rotate the valve at a speed different from the speed of revolution of the cylinder to cause the inlet and exhaust ports in said valve to be periodically and successively moved into register with the respective ports in said protuberant part.

20. In a rotary engine, a revoluble cylinder having a protuberant part provided with inlet and exhaust ports in communication with the interior of the cylinder, arcing points carried by said part interiorly thereof, a rotary valve having an annular recess loosely receiving said part to permit relative turning movements thereof about a common axis and having a series of gas inlet ports and a series of exhaust ports for respectively registering with the inlet and exhaust ports of said part when the valve and cylinder are relatively rotated, means for rotating the valve at a speed which is differential to the speed of revolution of the cylinder to periodically bring the valve ports into register with the respective cylinder ports, and means for causing a spark between the arcing points of the cylinder when the cylinder is at a predetermined point in each cycle of its movement.

21. In a rotary engine, a rotor having a plurality of cylinders each having a protuberant portion provided with a gas inlet port and an exhaust port in communication with the interior of the cylinder, with said ports in annular series concentric to the rotor axis, and means rotatable in concentric relation to the rotor and receiving said protuberant portions to coöperate therewith to periodically permit the inlet and exhaust of gases from respective cylinders.

22. In a rotary engine, a rotor having a plurality of cylinders each provided with a protuberant part forming gas inlet and exhaust ports in communication with the interior of the cylinder with the protuberant parts of the several cylinders in annular series, a rotary valve having an annular recess receiving said protuberant parts for coaxial rotation relative thereto and having gas inlet and exhaust ports for periodically registering with the respective ports of the cylinder parts, and means operable by a running of the engine to rotate the valve at a different speed from the speed of rotation of the rotor.

23. In a rotary engine, a rotor having a plurality of cylinders each having a protuberant part forming an inlet and an exhaust port in communication with the interior of the respective cylinders, the protuberant parts of the several cylinders being in annular series, means coaxially rotatable relative to said protuberant parts and coöperating therewith to permit the periodical entry and exhaust of gases to and from the respective cylinders at predetermined points in the cycle of each and having fins which render it operable to act as a pump for the inlet of charges to the cylinders, and ignition means automatically operable at a predetermined point in a cycle of each cylinder to fire a charge therein.

24. In a rotary engine, the combination with a rotor having a plurality of cylinders each provided with a port, of a hollow rotary element having exit ports and serving both as a pump for forcing fluid into the cylinder through its port and as a valve for periodically opening the cylinder ports to the source of fluid supply, and ignition means automatically operable at a predetermined point in a cycle of each cylinder to fire a charge therein.

25. In an internal combustion engine, the combination with a rotor having a plurality of cylinders each provided with an inlet port, of a rotary fuel pump rotatable differentially to the rotor and having means for controlling the timed periodical admission of charges to the respective cylinders during a running of the engine.

26. In an internal combustion engine, the combination with a rotor having a plurality of cylinders each provided with an inlet port and with an exhaust port, of a rotary fuel pump rotatable differentially to the rotor and having means for controlling the timed periodical admission of charges to and the exhaust of gases from the respective cylinders during a running of the engine.

27. A rotary motor having a revoluble cylinder provided with an inlet port, and a chambered rotary element having a wall for closing and opening said port and having means operable to periodically force fluid through said port.

28. A rotary motor having a revoluble cylinder provided with an inlet port, and a rotary pump having communication at its central portion with a source of fluid supply and having a portion provided with an outlet port which periodically registers with the cylinder port to permit fluid to be forced from the pump into the cylinder.

29. A rotary motor having a plurality of revoluble cylinders each provided with an inlet port, and a rotary pump having communication adjacent to its center with a source of fluid supply and having a portion thereof provided with outlet ports which periodically register with the cylinder ports to permit a forcing of fluid into the cylinders.

30. In a rotary motor, a plurality of revoluble cylinders each provided with an inlet port, a rotary pump having communication with a source of fluid supply and having an annular portion provided with ports for periodically registering with the cylinder ports to permit fluid to enter the cylinders from said pump.

31. In a rotary motor, a revoluble cylinder having a laterally protuberant part forming an inlet port to the cylinder, a rotary pump mounted for concentric and relative rotation with respect to said cylinder and having communication with a source of fluid supply, said pump having an annular portion slidingly receiving said protuberant part and provided with ports in communication through the pump with the source of fuel supply, said pump ports periodically registering with the port in said protuberant part to permit fluid to enter the cylinder from said pump.

32. In a rotary motor, a rotor having a plurality of radially disposed cylinders, an annular protuberant part connecting said cylinders and having a port for each cylinder in communication therewith, said protuberant part being tapered in cross-section and a valve rotatable with respect to said cylinders and having a part complemental to and receiving said tapered part for sliding engagement therewith and provided with ports which periodically register with the ports in said protuberant part to open the same to a source of fluid supply.

33. In a rotary motor, a rotor having a plurality of cylinders and a valve mounted for relative concentric rotation and each having ports which periodically register to open communication between the interior of the cylinders and a source of fuel supply, said valve being adjustable toward and away from the rotor.

34. In a rotary motor, a rotor having a cylinder, and a rotary valve, said rotor and valve being mounted for relative concentric rotation and having complemental V interengaging parts in sliding connection, said parts being provided with ports which periodically register during a running of the motor to open communication between the interior of the cylinder and a source of fuel supply.

35. In a rotary motor, a rotor having a cylinder, and a rotary valve, said rotor and valve being mounted for relative concentric rotation and having complemental interengaging parts in sliding connection which parts are provided with ports which periodically register to open communication between the interior of the cylinder and a source of fuel supply, said valve and rotor being relatively adjustable in axial relation.

36. In a rotary motor, a rotor having a cylinder, and a valve relatively rotatable with respect to said rotor, said rotor and valve having complemental parts which interengage in tapered wedge-like manner for relative coaxial sliding movements, said parts having ports which periodically register to open communication between the interior of the cylinder and a source of fuel supply and said valve and rotor being relatively adjustable axially thereof to take up wear between said parts.

37. In a rotary motor, a rotor having a cylinder and a hub flange and a valve rotatably mounted on said flange, said valve and cylinder having annular portions which interengage in sliding relation and have ports which periodically register to open communication between the interior of the cylinder and a source of fuel supply, said rotor and valve being relatively adjustable axially thereof to take up wear between said interengaging portions, and means for driving the valve at a speed differential to the speed of rotation of the rotor.

38. In a rotary motor, a rotor having a cylinder and a valve mounted for relative concentric rotation and each having tapered interengaging portions provided with ports which periodically register to open communication between the cylinder and a source of fuel supply, and means for imparting relative axial adjustment to the rotor and valve.

39. In a rotary motor, a case, a rotor and a valve mounted for relative concentric rotation within said casing and having ports which periodically register to open communication between the interior of a portion of said rotor and a source of fuel supply, a set of sparking points carried by the rotor within its ports, and sparking points carried by the valve and casing, said points periodically registering to fire a charge in the rotor.

40. In a rotary motor, a case, a rotor and a valve mounted for relative concentric rotation within said case and having ports which periodically register to open communication between the interior of a portion of said rotor and a source of fuel supply, and ignition means for effecting a periodical sparking within the fuel receiving portion of the rotor and having an electrode carried by the case.

41. In a rotary motor, a case, a rotor and a valve mounted for relative concentric rotation within said case and having ports which periodically register to open communication between the interior of a portion of said rotor and a source of fuel supply, and periodically operable charge igniting means having a part carried by the valve.

42. In a rotary motor, a case, a rotor and a valve mounted for relative concentric rotation within said case and having ports which periodically register to open communication between the interior of a portion of said rotor and a source of fuel supply, and periodically operable charge igniting means having parts carried by the valve and rotor.

43. In a rotary motor, a case, a rotor and a valve mounted for relative concentric rotation within said case and having ports which periodically register to open communication between the interior of a portion of said rotor and a source of fuel supply, and periodically operable charge igniting means having parts carried by said case, rotor and valve.

44. In a rotary motor, a case, a rotor and a valve mounted for relative concentric rotation within said case and having ports which periodically register to open communication between the interior of a portion of said rotor and a source of fuel supply, a set of sparking points carried by the rotor in position to ignite a charge in the interior thereof, and means carried in part by said case and valve and operable during a running of the rotor to effect a periodical sparking between said points.

45. In a rotary motor, a stationary case, a rotor mounted therein, a valve operable to periodically admit charges to said rotor, and ignition means having electrodes carried by said rotor and valve and periodically operable to ignite a charge in the rotor.

46. In a rotary motor, a stationary case, a rotor mounted therein, a rotary valve operable to periodically admit charges to said rotor, means for igniting a charge in the rotor, said means having a pair of electrodes carried by the rotor, and an electrode carried by each of said case and valve, said means being operable when said electrodes are in register to effect a sparking between the pair of electrodes carried by the rotor.

47. In a rotary motor, three relatively movable members and electrical ignition means having electrodes carried by each of said members which electrodes periodically register during a running of the motor to effect a charge ignition within a portion of one of said members.

48. In a rotary motor, a case, a rotor and a charge admission valve, and ignition means having parts carried by each of said case, rotor and valve and periodically operable to ignite a charge in the rotor.

49. In a rotary motor, a case, a rotor and a charge admission valve, and electrical ignition means having parts carried by each of said case, rotor and valve and periodically registering during a running of the motor to effect the ignition of a charge in the rotor.

In testimony whereof, I have hereunto signed my name to this specification in the presence of two subscribing witnesses.

HUBERT A. MYERS.

Witnesses:
C. W. OWEN,
P. D. WAGNER.

Copies of this patent may be obtained for five cents each, by addressing the "Commissioner of Patents, Washington, D. C."